(12) United States Patent
Haberman

(10) Patent No.: US 8,849,100 B2
(45) Date of Patent: Sep. 30, 2014

(54) SYSTEMS AND METHODS FOR MODIFYING COMMERCIALS

(75) Inventor: Seth Haberman, New York, NY (US)

(73) Assignee: Visible World, Inc., New York, NY (US)

(*) Notice: Subject to any disclaimer, the term of this patent is extended or adjusted under 35 U.S.C. 154(b) by 947 days.

(21) Appl. No.: 12/062,498

(22) Filed: Apr. 3, 2008

(65) Prior Publication Data

US 2008/0304809 A1 Dec. 11, 2008

Related U.S. Application Data

(60) Provisional application No. 60/921,813, filed on Apr. 4, 2007.

(51) Int. Cl.
| | | |
|---|---|---|
| *H04N 5/91* | (2006.01) | |
| *H04N 21/854* | (2011.01) | |
| *H04N 21/81* | (2011.01) | |
| *H04N 21/6587* | (2011.01) | |
| *H04N 21/44* | (2011.01) | |
| *H04N 21/433* | (2011.01) | |
| *H04N 7/173* | (2011.01) | |
| *H04N 21/432* | (2011.01) | |
| *H04N 7/16* | (2011.01) | |
| *H04N 21/482* | (2011.01) | |
| *H04N 21/8355* | (2011.01) | |
| *H04N 21/845* | (2011.01) | |
| *H04N 21/472* | (2011.01) | |
| *H04N 21/431* | (2011.01) | |
| *H04N 21/2387* | (2011.01) | |

(52) U.S. Cl.
CPC ............ *H04N 7/165* (2013.01); *H04N 21/854* (2013.01); *H04N 21/812* (2013.01); *H04N 21/472* (2013.01); *H04N 21/6587* (2013.01); *H04N 21/8113* (2013.01); *H04N 21/44008* (2013.01); *H04N 21/4331* (2013.01); *H04N 21/4316* (2013.01); *H04N 7/17318* (2013.01); *H04N 21/4325* (2013.01); *H04N 21/2387* (2013.01); *H04N 21/4825* (2013.01); *H04N 21/8355* (2013.01); *H04N 21/8456* (2013.01)

USPC ........... 386/343; 386/249; 386/250; 386/251; 386/298; 386/349; 725/32

(58) Field of Classification Search
USPC ............. 386/343, 249–251, 298, 349; 725/32
See application file for complete search history.

(56) References Cited

U.S. PATENT DOCUMENTS

| 6,909,837 B1 | 6/2005 | Unger | |
|---|---|---|---|
| 2002/0104083 A1* | 8/2002 | Hendricks et al. .............. | 725/34 |

(Continued)

FOREIGN PATENT DOCUMENTS

| JP | 2003-289509 A | 10/2003 |
|---|---|---|
| JP | 2004-094618 A | 3/2004 |

(Continued)

OTHER PUBLICATIONS

International Search Report for PCT/US08/059324 mailed Sep. 18, 2008.

*Primary Examiner* — Michael Simitoski
*Assistant Examiner* — Gary Lavelle
(74) *Attorney, Agent, or Firm* — Pepper Hamilton LLP

(57) ABSTRACT

Methods and products to deliver at least a portion of an advertisement to a viewer at normal playback speeds after receiving a command from the viewer to fast-forward through an advertisement faster than normal playback speeds is described. In certain embodiments, the invention delivers a portion of the advertisement to be played at normal playback speeds to the viewer; and delivers the remaining portion of the advertisement to be played at a playback speed that is faster than the specified playback speed so that the combination of the portions delivered at normal and faster playback speeds is delivered to the user at the specified playback speed. In some other embodiments, the invention delivers at least a portion of the first advertisement to the viewer at normal playback speeds; and delivers one or more other advertisements to the viewer simultaneously with the first advertisement with the audio information muted based on the specified playback speed.

22 Claims, 5 Drawing Sheets

(56) References Cited

U.S. PATENT DOCUMENTS

| | | | |
|---|---|---|---|
| 2002/0144262 A1* | 10/2002 | Plotnick et al. | 725/32 |
| 2002/0191950 A1* | 12/2002 | Wang | 386/46 |
| 2003/0154128 A1* | 8/2003 | Liga et al. | 705/14 |
| 2004/0044570 A1 | 3/2004 | Aoyama | |
| 2004/0081428 A1 | 4/2004 | Funakoshi et al. | |
| 2004/0103429 A1 | 5/2004 | Carlucci et al. | |
| 2005/0076359 A1 | 4/2005 | Pierson et al. | |
| 2007/0179786 A1* | 8/2007 | Masaki et al. | 704/270 |
| 2007/0248314 A1* | 10/2007 | Iggulden | 386/68 |
| 2008/0115161 A1* | 5/2008 | Kurzion | 725/32 |
| 2008/0124052 A1* | 5/2008 | Sardera | 386/124 |
| 2008/0152300 A1* | 6/2008 | Knee et al. | 386/68 |
| 2008/0235087 A1* | 9/2008 | Amento et al. | 705/14 |
| 2009/0300676 A1* | 12/2009 | Harter, Jr. | 725/35 |

FOREIGN PATENT DOCUMENTS

| | | |
|---|---|---|
| JP | 2004-140723 A | 5/2004 |
| JP | 2006-006105 A | 1/2005 |
| JP | 2007-013359 A | 1/2007 |
| JP | 2007-518289 A | 7/2007 |
| WO | WO 2005/034503 A2 | 4/2005 |

* cited by examiner

THE FIRST COMMERCIAL WHEN FAST FOWARDED

SYSTEMS AND METHODS FOR MODIFYING COMMERCIALS

CROSS-REFERENCE TO RELATED APPLICATIONS

This application claims the benefit of the filing date of U.S. patent application Ser. No. 60/921,813, filed on Apr. 4, 2007, the contents of which are incorporated by reference herein in its entirety.

FIELD OF THE INVENTION

The present invention relates to the field of personal video recording systems. More particularly, the present invention relates to modifying commercials during fast-forward playback.

BACKGROUND OF THE INVENTION

In recent years, personal video recorders (PVRs), such as those manufactured by TiVo, Inc. and those built-in to set-top boxes provided by local cable companies, have become readily available to consumers. Using a hard drive or storage device and software, a PVR allows a television viewer to pause, rewind, fast forward, or playback a live television program that the viewer is watching. The PVR also allows the television viewer to record a program, where the recorded program will be stored on the PVR for future playback.

In addition to recording television programs, the PVR also records the advertisements or commercials that are placed at given intervals during the broadcasted television programs. For example, as shown in FIG. 1A, a thirty-minute television program 100 may be divided into three eight-minute segments with three two-minute advertisement or commercial groups 110, 120, and 130. FIG. 1B shows that each two-minute advertisement or commercial group may include four thirty-second commercial spots 140, 150, 160, and 170 in succession.

However, the viewer that wishes to watch a program without interruption often considers these commercials a nuisance. Consequently, when the viewer plays back a recorded television program using the PVR, the viewer generally tends to fast forward through many or all of the commercials that were also recorded. Using the PVR, the viewer has the option of fast forwarding through these commercials at different rates—e.g., 2× speed in response to pressing the fast forward button once, 3× speed in response to pressing the fast forward button twice, and 4× speed in response to pressing the fast forward button three times. Generally, there is no audio playback when a viewer performs a fast forward operation. Thus, when fast forwarding through commercials, the commercials are muted, the video images are accelerated at the rate selected by the viewer, and the interruption to viewing the recorded program is minimized.

Accordingly, there exists a need for systems and methods that overcome these and other deficiencies in prior art systems.

For example, it would be desirable to allow viewers to fast forward through recorded video, such as a commercial, while still providing advertisers with an opportunity to present an advertising message.

BRIEF DESCRIPTION OF THE DRAWINGS

Various objects, features, and advantages of the present invention can be more fully appreciated with reference to the following detailed description of the invention when considered in connection with the following drawing, in which like reference numerals identify like elements.

DETAILED DESCRIPTION OF THE INVENTION

In accordance with the present invention, a commercial modification application (sometimes referred to herein as "the application") is provided. The application provides enhanced features for fast-forward playback through commercials while providing advertisers with an opportunity to present an advertising message in a space that would otherwise be skipped by viewers.

It should be noted that the application may be integrated with an interactive television application that provides interactive services to a viewer. Interactive services may allow a viewer to change channels, record one or more television programs, playback recorded programs, etc.

It should also be noted that although the following embodiments of the invention are described as relating to the playback of television program and media content from a personal video recorder, these embodiments are not limited only to playback of content on a personal video recorder. The application may be implemented on any suitable equipment, such as, for example, a set-top box, a digital video recorder (DVR), a computer, a configuration in which a DVR or PVR is integrated with a set-top box, etc. For example, the application may be implemented on a computer that is receiving streamed content. More specifically, the application may be embodied as a computer program product residing on one or more computer readable media, such a CD, DVD, hard drive, memory device, and the like, and instruct the related computer hardware (e.g., PVR, set-top box, TV, personal computer, etc.) to carry out the functions described herein. As illustrated above, the term "computer" will generally refer to devices/equipments/hardware having at least a microprocessor and a computer readable media that is capable of delivering one or more advertisements to a viewer.

The equipment may receive instructions from the viewer by any suitable input device (e.g., a remote control, a keyboard, an on-screen approach, etc.). For example, instructions from a viewer may be received using a remote control that has multiple buttons, such as a fast-forward button, a rewind button, a play button, a record button, a pause button, a stop button, a skip commercial button, etc. The remote control allows the viewer to fast-forward and rewind at multiple speeds though television content.

Figure 1A:
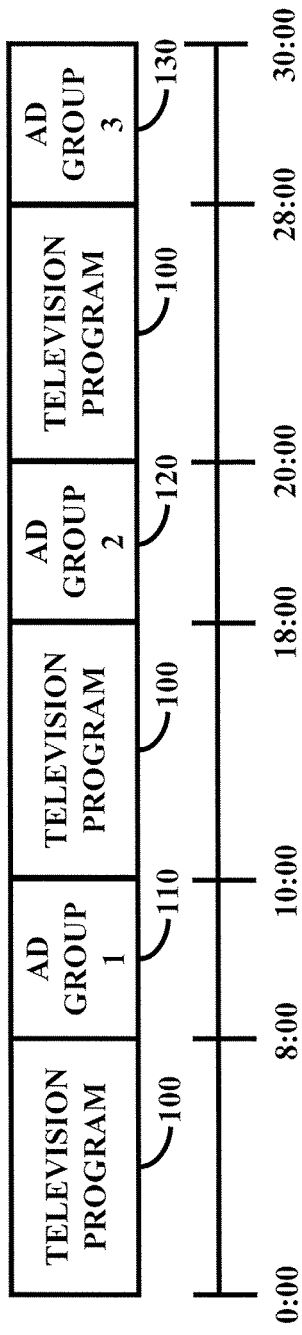
FIG. 1A is a schematic diagram showing a thirty-minute television program with commercial breaks.
Figure 1B:
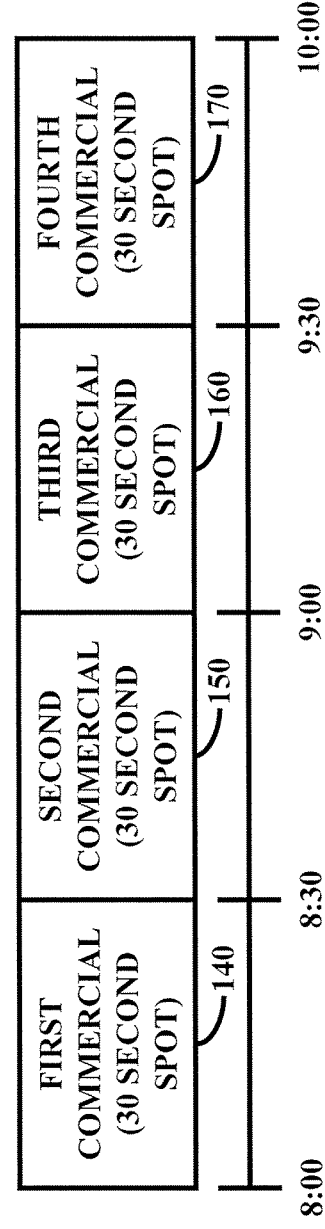
FIG. 1B is a schematic diagram showing a two-minute advertisement or commercial sequence that is provided during on of the commercial breaks.
Figure 2A:
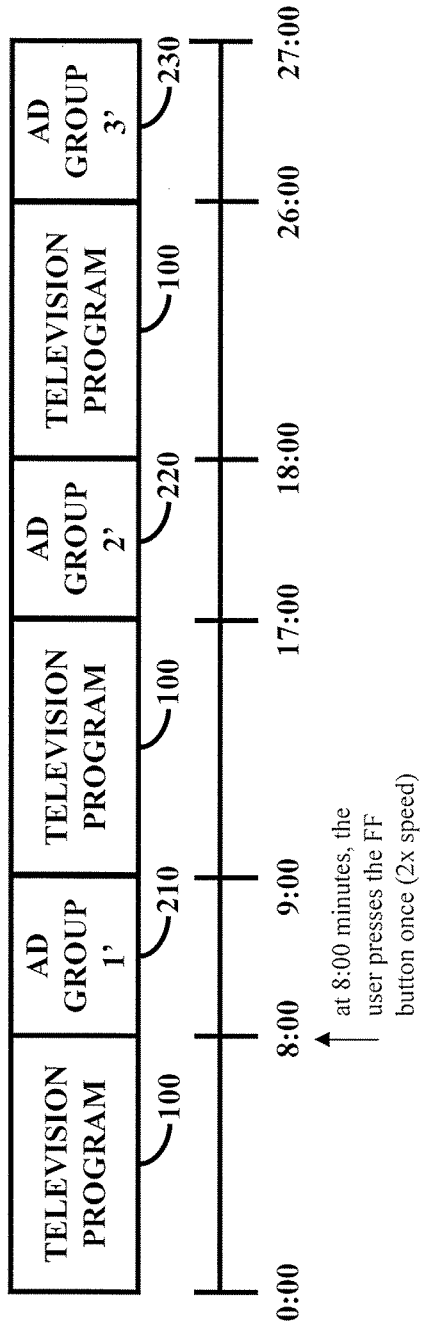
FIGS. 2A and 2B are illustrative schematic diagrams showing a modified commercial in response to a viewer action in accordance with some embodiments of the present invention.

As shown in FIG. 2A, the viewer is watching a television program. The television program may be a recorded program that is stored on the PVR. The television program may also be a live or broadcasted program that the viewer is currently tuned to and the PVR is concurrently storing the program as it is being broadcast in a local cache or other storage device.

The application is invoked in response to the viewer, for example, pressing the "fast-forward" button on the remote control once the television program is at the first commercial break or upon displaying the first commercial. Typically, such a viewer action causes the PVR to fast-forward through content (e.g., a television program, a commercial, etc.) at twice the playback. Instead, the application provides advertisers with an alternate approach for providing an advertising message.

In some embodiments, the application may detect when a commercial break occurs in the program sequence. In response to the viewer pressing the "fast-forward" button on the remote control during a commercial break, the application determines the length of the commercial, plays back a portion of the commercial in the initial playback speed (1×), and fast-forwards or increases the playback speed of the remainder of the commercial. It should be noted that the application determines the playback speed of the remainder of the commercial and compensates for the initial playback such that the commercial ends at the same time as if the viewer had pressed the fast-forward button on the remote control and fast-forwarded through the entire commercial (e.g., at 2× speed).

Figure 2B:
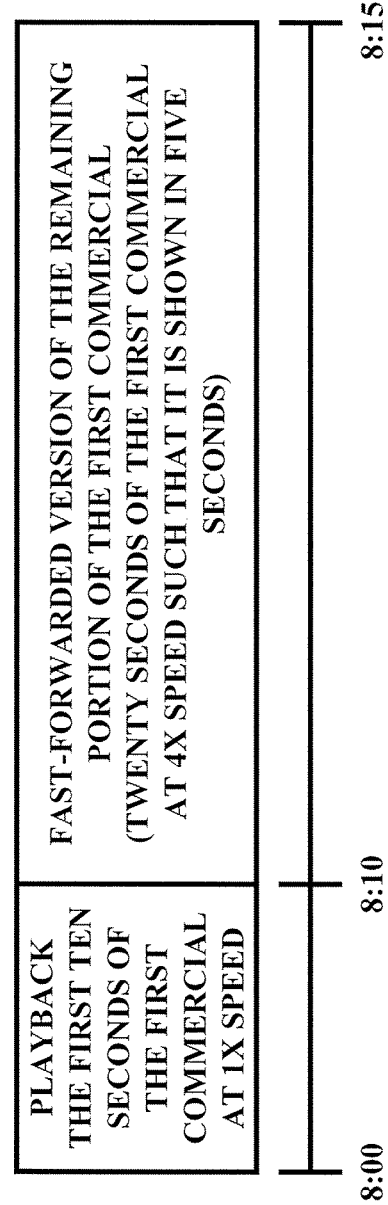

For example, as shown in FIGS. 2A and 2B, in response to pressing the fast-forward button once at the 8:00 minute mark of the television program, the application determines the length of the first commercial. Based on this determination, the application instructs the PVR to playback a portion of the first commercial. As shown in FIG. 2B, the application has determined that the first ten seconds of a thirty-second first commercial are to be shown (portion 250 of the first commercial). Upon providing the first ten seconds of the first commercial, the application may increase the playback speed of the remainder of the first commercial. As the viewer has pressed the fast-forward button once to instruct the PVR to fast-forward through the commercial at 2× speed, the application determines that a fast-forwarded thirty-second commercial is to be shown in fifteen seconds. Accordingly, the application increases the playback rate of the remaining twenty seconds of the first commercial so that it is shown in the remaining five seconds.

In another suitable embodiment, the application may divide up the commercial into different portions and playback each portion of the commercial at different rates. For example, a thirty-second commercial may be divided up into a five-second portion (the first portion), a twenty-second portion (the second portion), and five-second portion (the third portion). The first portion and the third portion are played back in the initial 1× speed and the playback rate of the second portion is increased such that the twenty-second portion is played back in five seconds (i.e., 4× speed). It should be noted that even though the first and third portions are played back at 1× speed, the playback of the entire commercial has not taken a longer time period than if the viewer fast-forwarded through the entire commercial at 2× speed.

In some embodiments, the application may divide up the commercial into different portions based on the playback speed the viewer has selected (e.g., 2× fast-forward, 3× fast-forward, 4× fast-forward). For example, if the viewer selects to fast-forward through a thirty-second commercial at a rate of 3× fast-forward, the application may playback the first ten seconds of the commercial in 1× speed and not playback the remainder of the commercial. Note that the first ten second portion of the commercial that is provided to the viewer has not taken a longer time period than if the viewer fast-forwarded through the entire commercial at 3× speed. In another example, the application may playback the first five seconds and increase the playback rate of the remaining twenty-five seconds of the commercial such that it is played back in five seconds (i.e. 5× speed).

It should also be noted that the invention is not limited to changing the rate of the playback of a commercial in response to a viewer action (e.g., pressing the fast-forward button on the remote control) at the start of a commercial break. The application may determine the playback rate of the commercial at any point that a viewer action is received. For example, if the viewer has watched three seconds of a thirty-second commercial and then presses the fast-forward button on the remote control, the application may determine a portion of the remainder of the commercial to playback at one rate (e.g., 1× speed) and another portion of the remainder of the commercial to playback at another rate (e.g. 5× speed, 10× speed, etc.).

It should also be noted that the application may then slow down, fade in, fade out, or any other suitable approach for transitioning to the start of the next commercial. The application may similarly playback a portion of the next commercial and then increase the playback rate of the remainder of the next commercial.

Using the application, the result will be a commercial that plays in a given time (e.g., five seconds, fifteen seconds, etc.) that satisfies the viewers' expectation but allows an initial period of time for a viewer to see if the viewer is interested.

Figure 3:
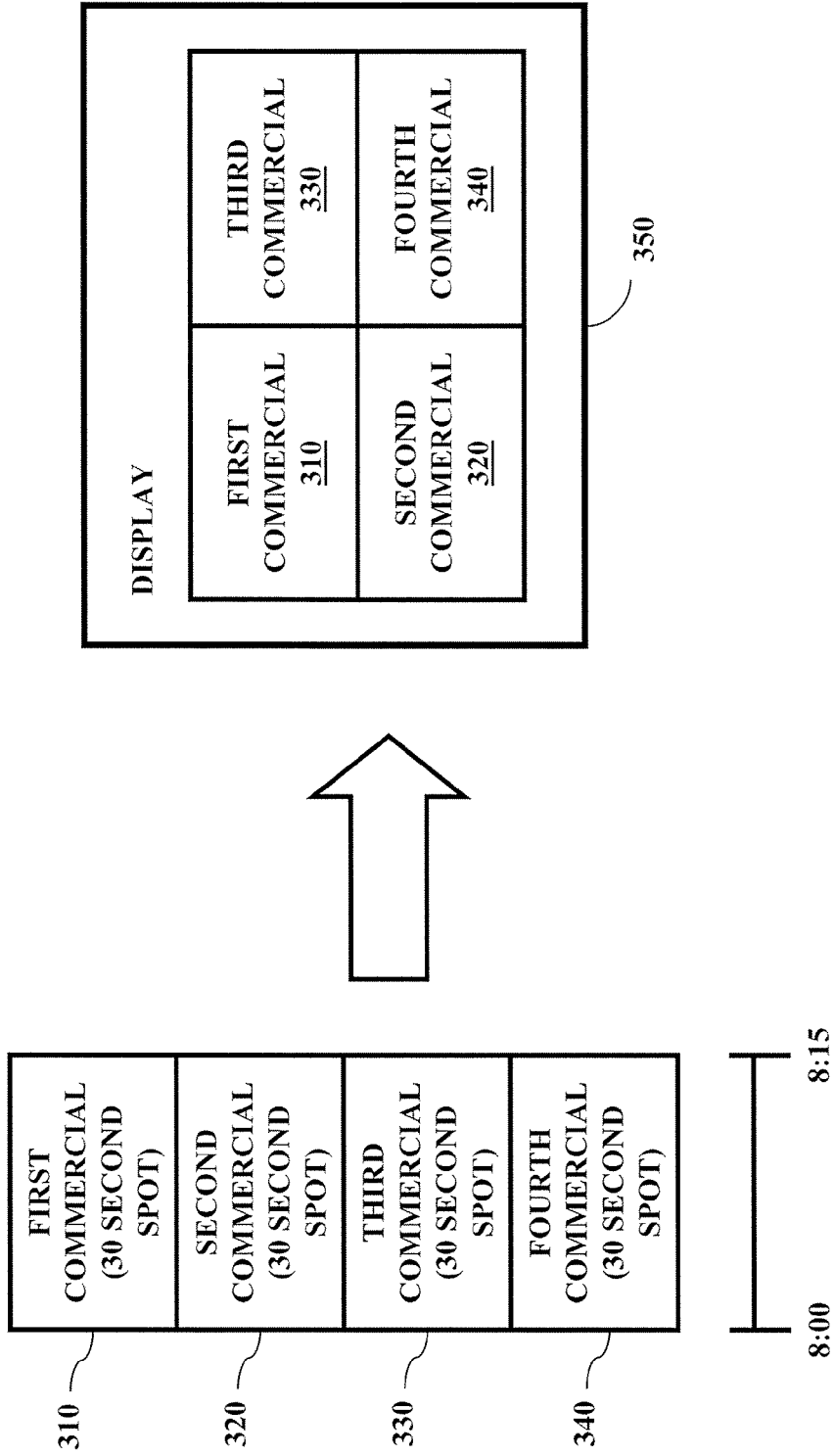
FIG. 3 is an illustrative schematic diagram showing multiple commercials that are simultaneously displayed in response to a viewer action in accordance with some embodiments of the present invention.

In some embodiments, the application may provide multiple commercials concurrently in response to the viewer pressing a fast-forward button on the remote control or other suitable input device during a commercial break. In response, the application may determine the number of commercials that are to be provided in a given commercial break. For example, as shown in FIG. 3, the application has determined that four commercials—i.e., a first commercial 310, a second commercial 320, a third commercial 330, and a fourth commercial 340, are to be played back during a given commercial break. The application may combine the content from the four commercials such that the four commercials are played back simultaneously (display 350).

In another suitable embodiment, the application may simultaneously display the first commercial and the second commercial and then simultaneously display the third commercial and the fourth commercial. In some embodiments, the application may determine the number of commercials to simultaneously display based on the playback rate selected by the viewer. For example, in response to the viewer selecting a playback rate of 2×, the application may simultaneously display two commercials (two thirty-second commercials displayed simultaneously in thirty seconds).

Figure 4:
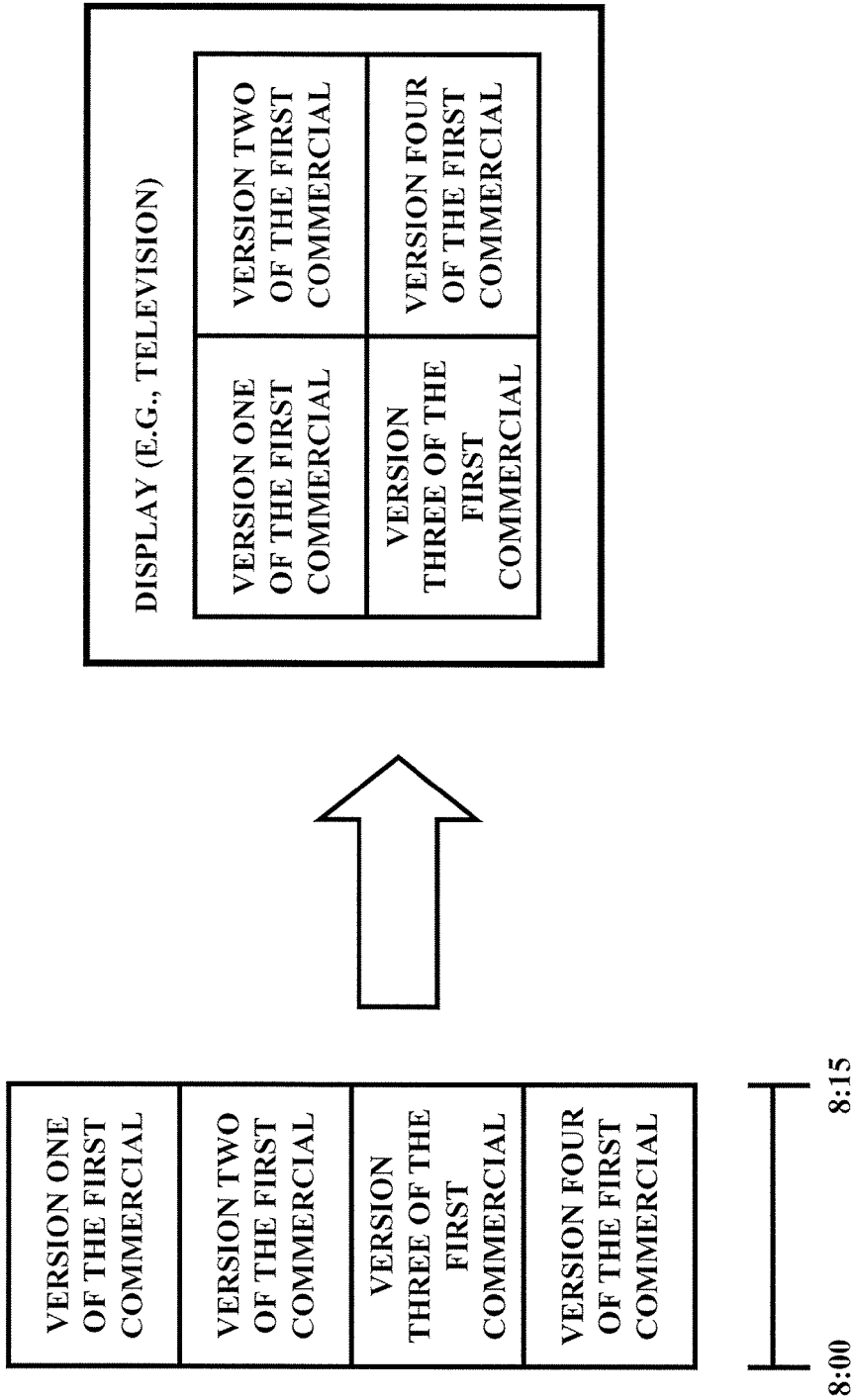
FIG. 4 is an illustrative schematic diagram showing multiple versions of a commercial that are simultaneously displayed in response to a viewer action in accordance with some embodiments of the present invention.

In some embodiments, the application may simultaneously display multiple versions of a commercial. For example, as shown in FIG. 4, in response to the receiving a viewer action (e.g., the viewer pressing the fast-forward or rewind button on a remote control), the application may provide multiple versions of the commercial to the viewer simultaneously. Each commercial may have a different media segments (e.g., portions of audio, portions of video, background audio, voiceovers, images, animations, graphics, ending, etc.).

In another example, the application may provide the viewer with multiple commercials from the same advertiser (e.g., each commercial is generated by Comcast). In yet another example, the application may provide the viewer with multiple commercials for the same product or service (e.g., each commercial relates to a particular Comcast service).

Figure 5:
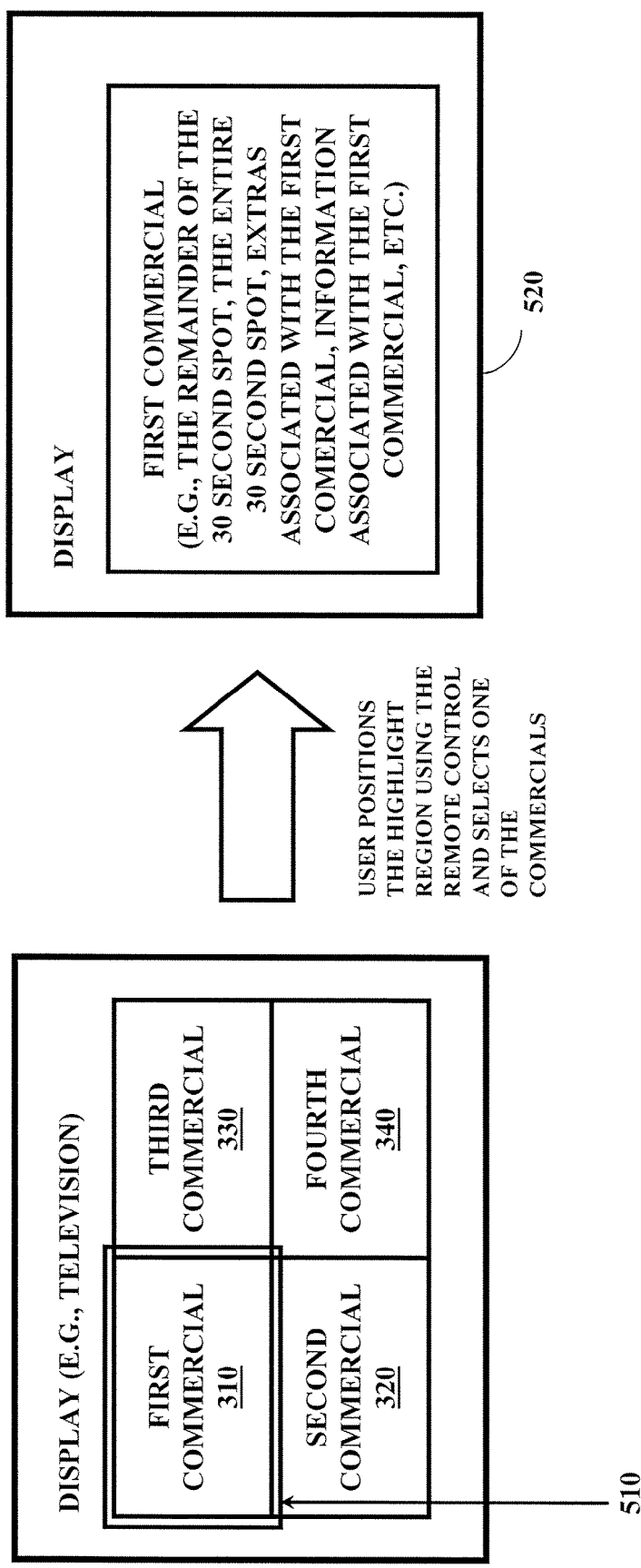
FIG. 5 is an illustrative schematic diagram showing a commercial that is being displayed in response to a viewer selection from multiple, simultaneously displayed commercials in accordance with some embodiments of the present invention.

In response to providing the viewer with multiple commercials simultaneously, the application may provide the audio track for one of the commercials. For example, the application may allow the viewer to place a highlight region 510 over one of the displayed commercials. As shown in FIG. 5, the highlight region 510 has been placed over first commercial 310. In response to the viewer selecting first commercial 310 by, for example, pressing a select button or other suitable interface, the application displays the first commercial to the viewer in display 520. The application may display the remainder of the first commercial, the entire first commercial (e.g., the thirty-second spot), the first commercial with additional content (e.g., coupon codes, personalized content, additional information associated with the selected commercial, etc.), etc.

In some embodiments, the application may provide the viewer with audio during the portions that are played back at a different rate (e.g., fast-forwarded or rewinded at 2×, 3×, 4×, 5×, 10×, etc.). With the advent of digital audio, it may be computationally expensive to recreate analog audio effects. In response to the application changing the playback rate for a portion of the commercial as described above, the application may retrieve the audio for that portion of the commercial and adjust the pitch of the audio. The application can play most of the words from the audio track, thereby removing a great deal of silence that normally occurs during fast-forward or rewind playback. Accordingly, the application can provide viewers with a significant portion of the audio track without having to prepare the audio track prior to playback.

In some embodiments, the application may provide the viewer with a complementary audio track that is particularly designated to be utilized for certain playback speeds. The complementary audio track may be the original audio track associated with the video (as described above) or can be a specialized audio track to be utilized for certain playback rates. For example, when a viewer fast forwards or rewinds a commercial (e.g., fast-forwarded or rewinded at 2×, 3×, 4×, 5×, 10×, etc.), the application may retrieve the complementary audio track for that portion of the commercial and playback the audio track, either in real-time or with the pitch of the audio adjusted. Different complementary audio tracks may be designated for different fast-forward and/or rewind rates. The application can play the complementary audio track, thereby removing a great deal of silence that normally occurs during fast-forward or rewind playback.

In some embodiments, the application may provide the viewer with a commercial viewing option. In response to the receiving a viewer action (e.g., the viewer pressing the fast-forward or rewind button on a remote control), the application may provide the viewer with a selection of commercials. For example, in response to the viewer pressing the fast-forward button, the application may provide the user with a listing of commercials, a listing of brands, a listing of products and services, a listing of series of commercials, and/or any other suitable listing. The application may request that the viewer select and view one commercial or any other predetermined number of commercials prior to returning to the recorded content. For example, the application may prevent the viewer from fast-forwarding through the commercials and continuing to playback the program content until the viewer has selected one commercial to watch. In another example, the application, in a video-on-demand environment, may prompt the viewer to select from a list of commercials to view prior to downloading or viewing a selected video-on-demand program. In yet another example, the application, in a video-on-demand environment, may prompt the viewer to select from a list of commercials to download to the viewer's equipment (e.g., a set-top box) prior to downloading a selected video-on-demand program or prior to providing the viewer with a list of available video-on-demand programs.

In some embodiments, the application may provide the viewer with a commercial viewing option in response to the viewer hitting a rewind button on the remote control. In response to the viewer pressing the rewind button, the application may provide the user with a listing of commercials related to the commercial that the viewer watched. For example, when the viewer presses the rewind button after watching a Travel Channel commercial, the application may provide the viewer with a selectable list of Travel Channel commercials, where the list may include the commercial that the viewer viewed or a series of commercials relating to the recently viewed commercial. In another example, in response to pressing the rewind button after watching a Travel Channel commercial, the application may present the viewer with coupon codes relating to travel, the Travel Channel, sponsors of the Travel Channel, and/or advertisers on the Travel Channel. Alternatively, the application may provide the viewer with an option to view a different version of the commercial or a subsequent commercial in a series of commercials.

It should be noted that the application may include digital rights management features. For example, the advertiser may require that a predetermined amount of their advertisements be viewed at given speeds (e.g., 20% of their commercials must be viewed by at least 1× and 30% of their commercials must be viewed by at least 2×), at given portions of the screen (e.g., 10% of their commercials must be viewed in full size, 20% of their commercials must be viewed in at least split screen, etc.), etc.

In some embodiments, advertisers may set restrictions or parameters on each of their commercials. These parameters may be embedded within the commercial. For example, an advertiser may generate a commercial with the parameters that at least the first ten seconds must be viewed and that the commercial must be viewed in full screen. These parameter-embedded commercials may be transmitted to PVRs, where the processor of each PVR determines when a commercial is played back based on when the embedded parameters are met.

In some embodiments, the application may track and monitor the presentation of commercials to each PVR. For example, the application may monitor that the entire series of Travel Channel commercials were viewed in their entirety, ten seconds of a Verizon commercials was viewed, and one Comcast commercial was viewed in split screen with a Burger King commercial. The application may monitor each commercial in its varying speeds and presentations from each PVR and transmit this information to the operator of a database, where the database accounts for payments to and from advertisers.

As described hereinabove, the application provides enhanced features for modifying commercials while providing advertisers with an opportunity to present an advertising message in a space that would otherwise be skipped by viewers. One of ordinary skill would know how to utilize standard algorithms to implement the processes of the present invention based on the information provided in this application.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Although the present invention has been described and illustrated in the foregoing exemplary embodiments, it is understood that the present disclosure has been made only by way of example, and that numerous changes in the details of implementation of the invention may be made without departing from the spirit and scope of the invention.

What is claimed is:

1. A non-transitory computer program product residing on a computer readable medium to deliver at least a portion of an advertisement to a viewer at a normal playback speed, the computer program product comprising instructions for causing a computer to:
   receive a command to fast-forward or rewind through the advertisement at a specified playback speed that is faster than the normal playback speed;
   determine a specified playback time to play back the advertisement at the specified playback speed;
   deliver at least one normal playback portion of the advertisement to the viewer to be played at the normal playback speed;
   determine a remaining playback time of the advertisement; and
   deliver at least one remaining portion of the advertisement at a second playback speed that is faster than the specified playback speed such that the at least one remaining portion is delivered within the remaining playback time, thereby delivering the advertisement in a period of time no longer than specified playback time.

2. The non-transitory computer program product of claim 1, wherein the advertisement comprises information specifying a minimum portion of the advertisement to be played at the normal playback speed.

3. The non-transitory computer program product of claim 1, wherein a first portion of the advertisement to be played at the normal playback speed is delivered to the viewer, then a second portion of the advertisement to be played at a rate that is faster than the specified playback speed is delivered to the viewer, and then a third portion of the advertisement to be played at the normal playback speed is delivered to the viewer.

4. The non-transitory computer program product of claim 1, wherein the advertisement comprises audio information and video information.

5. The non-transitory computer program product of claim 4, wherein at least a portion of the audio information in the at least one remaining portion of the advertisement is delivered to the viewer and played at the normal playback speed while the video information in the at least one remaining portion of the advertisement is is delivered to the viewer at a speed that is faster than the specified playback speed.

6. The non-transitory computer program product of claim 1, further comprising instructions for causing a computer to present the viewer with a selection of other advertisements to be viewed at the normal playback speed while delivering the at least one remaining portion of the advertisement at a speed that is faster than the specified playback speed.

7. The non-transitory computer program product of claim 1, wherein the command is received after a start of the advertisement.

8. The non-transitory computer program product of claim 1, further comprising instructions to send information regarding a viewing history of the advertisement to a database.

9. A non-transitory computer program product residing on a computer readable medium to deliver at least a portion of an advertisement to a viewer at a normal playback speed, the computer program product comprising instructions for causing a computer to:
   determine a number of advertisements in a plurality of advertisements of an up-coming commercial break, each of the plurality of advertisements comprising audio information and video information;
   receive a command to fast-forward through a first advertisement of the plurality of advertisements at a specified playback speed;
   deliver at least one normal playback portion of the first advertisement to the viewer at the normal playback speed with the audio information; and
   deliver each remaining advertisement of the plurality of advertisements to the viewer simultaneously with the first advertisement;
   wherein each of the remaining advertisements of the plurality of advertisements is delivered without the audio information or with the audio information muted, and
   wherein a number of the remaining advertisements of the plurality of advertisements delivered to the viewer is determined based on a duration of the first advertisement delivered at the specified playback speed.

10. The non-transitory computer program product of claim 9, further comprising instructions for causing the computer to:
   present the viewer with an option to select at least one other advertisement with the audio information and the video information while the audio information in the first advertisement is muted; and
   receive a selection designating the at least one other advertisement.

11. The non-transitory computer program product of claim 10, wherein the first advertisement comprises information specifying a minimum portion of the first advertisement to be played with the audio information before the at least one other advertisement designated by the selection is played with the audio information.

12. The non-transitory computer program product of claim 9, further comprising instructions for causing the computer to:
   deliver at least a portion of the first advertisement to the viewer to be played at the normal playback speed;
   determine a specified playback time to play back the advertisement at the specified playback speed;
   deliver a remaining portion of the first advertisement to be played at a speed that is faster than the specified playback speed so that the first advertisement is delivered within the specified playback time; and
   determining a number of one or more other advertisements to be delivered to the viewer based on the specified playback speed, the at least a portion of the first advertisement to be played at the normal playback speed, and the remaining portion of the first advertisement to be played at a speed that is faster than the specified playback speed.

13. The non-transitory computer program product of claim 9, wherein the one or more other advertisements comprise different versions of the first advertisement.

14. The non-transitory computer program product of claim 9, wherein the one or more other advertisements comprise different advertisements from the advertiser of the first advertisement.

15. The non-transitory computer program product of claim 9, wherein the one or more other advertisements comprise different advertisements having a similar classification of product or service being advertised as the first advertisement.

16. The non-transitory computer program product of claim 9, further comprising instructions to send information regarding a viewing history of the first advertisement to a database.

17. A non-transitory computer program product residing on a computer readable medium to deliver at least a portion of an advertisement to a viewer at a normal playback speed, the computer program product comprising instructions for causing a computer to:
   receive a command to fast-forward or rewind through the advertisement at a first playback speed that is faster than the normal playback speed, wherein the advertisement comprises video information and audio information;
   deliver a first portion of video information of the advertisement to the viewer to be played at the normal playback speed;
   deliver a second portion of the video information of the advertisement at a second playback speed, wherein the second playback speed is calculated such that playback of the first and second portions of the video information of the advertisement is delivered in a period of time no longer than a duration of the advertisement delivered at the first playback speed; and
   deliver at least a portion of the audio information to the viewer at the normal playback speed while delivering at least one of the first and second portions of the video information of the advertisement.

18. The non-transitory computer program product of claim 17, wherein the audio information comprises a default audio track and one or more complementary audio tracks that are played when the advertisement is played at a playback speed that is faster than the normal playback speed.

19. The non-transitory computer program product of claim 18, wherein at least a portion of one of the complementary audio tracks is delivered to the viewer after processing the command to fast-forward or rewind through the advertisement.

20. The non-transitory computer program product of claim 18, wherein at least a portion of the default audio track is delivered to the viewer at the normal playback speed.

21. A method to deliver at least a portion of an advertisement to a viewer at a normal playback speed, the method comprising:
   receiving a command to fast-forward or rewind through the advertisement at a first playback speed that is faster than the normal playback speed;
   delivering at least a first portion of the advertisement to the viewer to be played at the normal playback speed;
   delivering a second portion of the advertisement at a second playback speed, wherein the second playback speed is calculated such that playback of the first and second portions of the advertisement is delivered in a period of time no longer than a duration of the advertisement delivered at the first playback speed.

22. A method to deliver at least a portion of an advertisement to a viewer at a normal playback speed, the method comprising:
   determining a number of advertisements in a plurality of advertisements in an up-coming commercial break, each of the advertisements in the plurality of advertisements comprising video information and audio information;
   receiving a command to fast-forward or rewind through a first advertisement of the plurality of advertisements at a specified playback speed;
   delivering at least a first portion of the first advertisement to the viewer at the normal playback speed;
   delivering each remaining advertisement of the plurality of advertisements to the viewer simultaneously with the first advertisement;
   wherein each of the remaining advertisements of the plurality of advertisements is delivered without audio information or with muted audio information; and
   wherein a number of the remaining advertisements of the plurality of advertisements delivered to the viewer is determined based on a duration of the advertisement delivered at the specified playback speed.

\* \* \* \* \*